(12) United States Patent
Yoshiwara et al.

(10) Patent No.: US 10,522,831 B2
(45) Date of Patent: Dec. 31, 2019

(54) POSITIVE-ELECTRODE ACTIVE MATERIAL FOR NON-AQUEOUS SECONDARY BATTERY AND METHOD FOR PRODUCING THE SAME

(71) Applicant: NICHIA CORPORATION, Anan-shi, Tokushima (JP)

(72) Inventors: Hideaki Yoshiwara, Anan (JP); Tsutomu Yamada, Anan (JP); Masahiro Murayama, Tokushima (JP)

(73) Assignee: NICHIA CORPORATION, Anan-shi (JP)

(*) Notice: Subject to any disclaimer, the term of this patent is extended or adjusted under 35 U.S.C. 154(b) by 67 days.

(21) Appl. No.: 15/895,562

(22) Filed: Feb. 13, 2018

(65) Prior Publication Data

US 2018/0175389 A1   Jun. 21, 2018

Related U.S. Application Data

(62) Division of application No. 14/316,954, filed on Jun. 27, 2014, now abandoned.

(30) Foreign Application Priority Data

| Jun. 28, 2013 | (JP) | ................................. 2013-135703 |
| Aug. 20, 2013 | (JP) | ................................. 2013-170718 |
| Apr. 1, 2014 | (JP) | ................................. 2014-075347 |

(51) Int. Cl.
  *H01M 4/525* (2010.01)
  *H01M 10/054* (2010.01)
  (Continued)

(52) U.S. Cl.
  CPC .......... *H01M 4/525* (2013.01); *C01G 45/006* (2013.01); *C01G 45/1228* (2013.01);
  (Continued)

(58) Field of Classification Search
  CPC ...................................................... H01M 4/00
  See application file for complete search history.

(56) References Cited

U.S. PATENT DOCUMENTS

| 3,931,025 A | * | 1/1976 | Woditsch | .................. | C09C 1/24 |
| | | | | | 252/62.62 |
| 4,112,063 A | * | 9/1978 | Buxbaum | .............. | C01G 49/06 |
| | | | | | 423/633 |

(Continued)

FOREIGN PATENT DOCUMENTS

| JP | 2005-317511 A | 11/2005 |
| JP | 2009-135092 A | 6/2009 |
| JP | 2010-080424 A | 4/2010 |
| WO | 2012-060295 A1 | 5/2012 |

OTHER PUBLICATIONS

Yabuuchi et al., "P2-type Nax[Fe1/2Mn1/2]O2 made from earth-abundant elements for rechargeable Na batteries," Nature Materials. Supplementary Information. 9 pages.

(Continued)

*Primary Examiner* — William D Young
(74) *Attorney, Agent, or Firm* — Hunton Andrews Kurth LLP

(57) ABSTRACT

The present invention provides a positive-electrode active material for non-aqueous secondary battery comprising a sodium transition metal composite oxide represented by Formula:

$Na_xFe_{1-y}M_yO_2$, wherein $0.4 \leq x \leq 0.7$, $0.25 \leq y < 1.0$, and M is at least one element selected from the group consisting of manganese, cobalt and nickel, the sodium transition metal composite oxide having a crystal structure substantially composed of $P6_3/mmc$ alone.

5 Claims, 2 Drawing Sheets

(51) Int. Cl.
  *C01G 45/00* (2006.01)
  *C01G 45/12* (2006.01)
  *C01G 49/00* (2006.01)
  *C01G 51/00* (2006.01)
  *C01G 53/00* (2006.01)
  *H01M 4/505* (2010.01)

(52) U.S. Cl.
  CPC ....... *C01G 49/009* (2013.01); *C01G 49/0018* (2013.01); *C01G 51/006* (2013.01); *C01G 51/42* (2013.01); *C01G 53/006* (2013.01); *C01G 53/42* (2013.01); *H01M 10/054* (2013.01); *C01P 2002/72* (2013.01); *C01P 2002/76* (2013.01); *C01P 2006/40* (2013.01); *H01M 4/505* (2013.01)

(56) References Cited

U.S. PATENT DOCUMENTS

| | | |
|---|---|---|
| 2010/0248001 A1 | 9/2010 | Kuze et al. |
| 2011/0159345 A1* | 6/2011 | Makidera ........... C01G 49/0027 429/144 |
| 2014/0014873 A1 | 1/2014 | Yabuuchi et al. |

OTHER PUBLICATIONS

Naoaki Yabuuchi et al., P2-Type $Na_x[Fe_{1/2}Mn_{1/2}]O_2$ made from earth-abundant elements for rechargeable Na batteries, Letters, Nature Materials, 2012, pp. 512-517, vol. 11, No. 6.

* cited by examiner

POSITIVE-ELECTRODE ACTIVE MATERIAL FOR NON-AQUEOUS SECONDARY BATTERY AND METHOD FOR PRODUCING THE SAME

CROSS-REFERENCE TO RELATED APPLICATIONS

This is a Divisional of U.S. application Ser. No. 14/316,954 filed on Jun. 27, 2014, which claims priority under 35 U.S.C. 119 from Japanese patent Application No. 2013-135703, filed on Jun. 28, 2013, Japanese patent Application No. 2013-170718, filed on Aug. 20, 2013 and Japanese patent Application No. 2014-075347, filed on Apr. 1, 2014, the disclosures of which are incorporated by reference herein.

BACKGROUND OF THE INVENTION

Field of the Invention

The present invention relates to positive-electrode active materials for non-aqueous secondary batteries such as sodium ion secondary batteries, and to methods for producing the same.

Description of the Related Art

At present, non-aqueous secondary batteries, typically lithium ion secondary batteries, have been in practical use in compact electronic devices such as mobile phones and laptop computers. Lithium ion secondary batteries have as high an operating voltage as about 4 V and can store large amounts of energy per unit mass. Due to these advantages, their application to large apparatuses such as electric vehicles and power storage systems has been expected. In the lithium ion secondary batteries, lithium transition metal composite oxides such as lithium cobaltate are typically used as the positive-electrode active materials.

However, lithium and transition metals such as cobalt are rare or precious elements due to reasons such as that the reserves of these elements are unevenly distributed and also that such elements are obtained by separation as impurities from materials such as minerals. Under these circumstances, it has been proposed that sodium transition metal composite oxides having a layered structure based on abundant elements such as iron and sodium be used as the positive-electrode active materials. Sodium ion secondary batteries involving such positive-electrode active materials have been also proposed.

Patent Literature 1 discloses composite oxides represented by $NaFe_{1-x}M_xO_2$, wherein M is a trivalent metal element and $0 \le x < 0.5$. The disclosure describes production methods involving $Na_2O_2$ and $Fe_3O_4$ as examples of a sodium compound and an iron compound that are raw materials.

Patent Literature 2 discloses composite metal oxides with a layered rock salt structure represented by Formula $Na_xFe_{1-y}M_yO_2$, wherein M is an element such as Mn, $0.5 < x < 1$ and $0 < y < 0.5$. According to the disclosure, the above range of x ensures that the layered rock salt crystal structure will have high purity and more sodium ions are available for doping and dedoping. The disclosure also describes production methods involving $Na_2CO_3$, $Fe_3O_4$ and $MnO_2$ as examples of a sodium compound, an iron compound and a manganese compound that are raw materials.

Patent Literature 3 discloses composite metal oxides including a P2 structure oxide and a layered oxide that are represented by Formula $Na_xFe_yMn_{1-y}O_2$, wherein $2/3 < x < 1$ and $0 < y < 2/3$. The disclosure describes production methods involving $Na_2CO_3$, $NaHCO_3$, $Na_2O_2$, $Fe_3O_4$ and $MnO_2$ as examples of sodium compounds, an iron compound and a manganese compound that are raw materials.

According to Non Patent Literature 1, the composite metal oxides described in Patent Literatures 2 and 3 have an R-3m crystal structure when the sodium to transition metal ratio is 1, but the layered structure comes to take a $P6_3/mmc$ crystal structure when the ratio is less than 1. The $P6_3/mmc$ structure is more resistant to breakage by the desorption and insertion of sodium ions than the R-3m structure, and this fact makes the $P6_3/mmc$ crystal structure advantageous in terms of charge and discharge characteristics at a high stage of charge (SOC).

CITATION LIST

Patent Literature 1: JP 2005-317511A
Patent Literature 2: JP 2009-135092A
Patent Literature 3: WO 2012/060295
Non Patent Literature 1: Nature Materials, Vol. 11, No. 6, pp. 512-517 (2012).

SUMMARY OF THE INVENTION

A first embodiment is a positive-electrode active material for non-aqueous secondary battery comprising a sodium transition metal composite oxide that is represented by Formula $Na_xFe_{1-y}M_yO_2$, wherein $0.4 \le x \le 0.7$, $0.25 \le y < 1.0$, and M is at least one element selected from the group consisting of manganese, cobalt and nickel and having a crystal structure substantially composed of $P6_3/mmc$ alone. The positive-electrode active material is satisfactory both in charge-discharge capacity and cycle characteristics and in other properties.

A second embodiment is a method for producing a positive-electrode active material for non-aqueous secondary battery comprising a sodium transition metal composite oxide represented by Formula $Na_xFe_{1-y}M_yO_2$, wherein $0.4 \le x \le 0.7$, $0.25 \le y < 1.0$, and M is at least one element selected from the group consisting of manganese, cobalt and nickel, comprising a precipitate formation step of obtaining a precipitate of a transition metal composite compound from a transition metal ion-containing aqueous solution, a heat treatment step of heat treating the precipitate from the precipitate formation step to obtain a transition metal composite oxide precursor, a mixing step of mixing the precursor from the heat treatment step with at least a sodium compound to obtain a raw material mixture, and a calcination step of calcining the raw material mixture from the mixing step to obtain a calcined product.

A third embodiment is a method for producing a positive-electrode active material for non-aqueous secondary battery comprising a sodium transition metal composite oxide represented by Formula $Na_xFe_{1-y}M_yO_2$, wherein $0.4 \le x \le 0.7$, $0.25 \le y < 1.0$, and M is at least one element selected from the group consisting of manganese, cobalt and nickel, comprising a precipitate formation step of obtaining a precipitate of a transition metal composite compound other than a hydroxide from a transition metal ion-containing aqueous solution, a mixing step of mixing the precipitate from the precipitate formation step with at least a sodium compound to obtain a raw material mixture, and a calcination step of calcining the raw material mixture from the mixing step to obtain a calcined product.

DETAILED DESCRIPTION OF THE INVENTION

Figure 1:
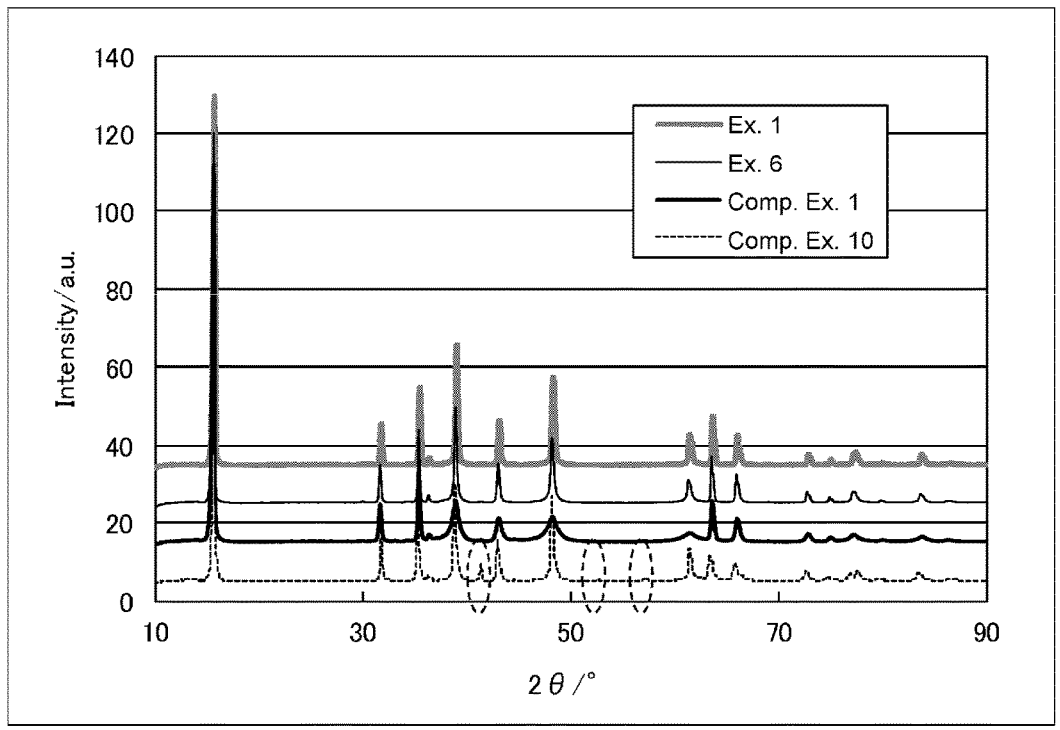
FIG. 1 is an example of XRD spectra showing data of positive-electrode active materials of the embodiment and comparative positive-electrode active materials.

Although Patent Literatures 2 and 3 mention that a mixture of metal-containing compounds with a prescribed chemical composition may be obtained by a crystallization method, the specifications do not teach any specific conditions in the production methods or whatsoever. The methods disclosed in Patent Literatures 1 to 3 involve the calcination of a raw material mixture produced by a so-called dry process. However, sodium transition metal composite oxides obtained by such methods contain subphases which have crystal structures different from the desired structure. When the target crystal structure is $P6_3/mmc$, subphases such as R-3m structure, Pnma structure and Fd-3m structure occur. The occurrence of such subphases is probably ascribed to the elements in the raw material mixture being mixed with insufficient uniformity.

On the other hand, the mixing of transition metal elements may be effected to sufficient uniformity by a so-called coprecipitation process in which transition metal ions are precipitated by pH control or with an agent such as a complexing agent. However, counter ions for the transition metal ions, for example, nitrate ions in the case of an aqueous transition metal nitrate salt solution, are often incorporated into the crystal or the precipitate aggregate during precipitation. Such counter ions that have been incorporated can adversely affect the performance of non-aqueous secondary batteries. Thus, the best performance of sodium ion secondary batteries cannot be achieved by the simple application of a coprecipitation process.

The present invention has been made in view of these circumstances. An object of the invention is to provide methods for producing positive-electrode active materials for non-aqueous secondary battery which have a high purity of $P6_3/mmc$ structure and allow non-aqueous sodium secondary batteries such as sodium ion secondary batteries to fully exhibit their performance. Another object of the invention is to provide positive-electrode active materials for non-aqueous sodium secondary batteries which are satisfactory both in charge-discharge capacity and cycle characteristics and in other properties.

The present inventor carried out extensive studies in order to achieve the above objects, completing the present invention. The present inventor has found that a sodium transition metal composite oxide which is substantially composed of $P6_3/mmc$ alone and has a very low content of counter ions may be obtained by a process in which a transition metal composite compound as a precursor is prepared by a coprecipitation method including specific steps, the precursor is then mixed with other raw material compounds, and the mixture is calcined. Specifically, the scope of the present invention includes the following aspects.

A first aspect of a method for producing a positive-electrode active material for non-aqueous secondary battery of the invention resides in a method for producing, the positive-electrode active material for non-aqueous secondary battery including a sodium transition metal composite oxide represented by Formula $Na_xFe_{1-y}M_yO_2$, wherein $0.4 \leq x \leq 0.7$, $0.25 \leq y < 1.0$, and M is at least one element selected from the group consisting of manganese, cobalt and nickel, the method comprising a precipitate formation step of obtaining a precipitate of a transition metal composite compound from a transition metal ion-containing aqueous solution, a heat treatment step of heat treating the precipitate from the precipitate formation step to obtain a transition metal composite oxide precursor, a mixing step of mixing the precursor from the heat treatment step with at least a sodium compound to obtain a raw material mixture, and a calcination step of calcining the raw material mixture from the mixing step to obtain a calcined product.

A second aspect of a method for producing a positive-electrode active material for non-aqueous secondary battery of the invention resides in a method for producing the positive-electrode active material for non-aqueous secondary battery including a sodium transition metal composite oxide represented by Formula $Na_xFe_{1-y}M_yO_2$, wherein $0.4 \leq x \leq 0.7$, $0.25 \leq y < 1.0$, and M is at least one element selected from the group consisting of manganese, cobalt and nickel, the method comprising a precipitate formation step of obtaining a precipitate of a transition metal composite compound other than a hydroxide from a transition metal ion-containing aqueous solution, a mixing step of mixing the precipitate from the precipitate formation step with at least a sodium compound to obtain a raw material mixture, and a calcination step of calcining the raw material mixture from the mixing step to obtain a calcined product.

A positive-electrode active material for non-aqueous secondary battery of the invention includes a sodium transition metal composite oxide that is represented by Formula $Na_xFe_{1-y}M_yO_2$, wherein $0.4 \leq x \leq 0.7$, $0.25 \leq y < 1.0$, and M is at least one element selected from the group consisting of manganese, cobalt and nickel and has a crystal structure substantially composed of $P6_3/mmc$ alone.

By virtue of the configurations mentioned above, the inventive methods for the production of positive-electrode active materials for non-aqueous secondary battery can produce sodium transition metal composite oxides which are substantially composed of a $P6_3/mmc$ structure alone and have a sufficiently low content of counter ions contained in the oxide.

By virtue of the configurations mentioned above, the inventive positive-electrode active material for non-aqueous secondary battery allows a battery to achieve advantageous charge-discharge capacity and cycle characteristics due to the $P6_3/mmc$ structure and also to perform well in other battery characteristics.

In the present specification, the term "step" as used herein encompasses not only an independent step but also a step in which the anticipated effect of this step is achieved, even if the step cannot be clearly distinguished from another step. Unless specifically indicated, in a case in which each ingredient of a composition includes plural materials, the content of each ingredient of the composition denotes the total amount of the plural materials included in the composition.

Hereinbelow, non-aqueous secondary battery positive-electrode active materials and methods for producing the active materials according to the present invention will be described in detail with reference to embodiments and examples.

1. Positive-Electrode Active Materials for Non-Aqueous Secondary Battery

First, the positive-electrode active materials for non-aqueous secondary battery, hereinafter, also written simply as "positive-electrode active materials", according to the present invention will be discussed in detail.

The positive-electrode active material for non-aqueous secondary battery of the invention includes a sodium transition metal composite oxide that is represented by Formula $Na_xFe_{1-y}M_yO_2$, wherein $0.4 \leq x \leq 0.7$, $0.25 \leq y < 1.0$, and M is at least one element selected from the group consisting of manganese, cobalt and nickel and has a crystal structure substantially composed of $P6_3/mmc$ alone.

Here, the presence of a $P6_3/mmc$ structure in the crystal structure may be identified based on, for example, a powder X-ray diffractometry (XRD) spectrum. The phrase "substantially composed of $P6_3/mmc$ alone" means that the crystal structure may include other subphases in addition to the $P6_3/mmc$ structure as long as the advantageous effects of the invention are achieved. Specifically, the content of the $P6_3/mmc$ structure is not less than 95%, and preferably not less than 98% of the crystal structure.

1-1. Chemical Composition

The chemical composition of the sodium transition metal composite oxide that is the main component is represented by the above formula. By limiting x to $0.4 \times 0.7$, the main crystal structure of the sodium transition metal composite oxide is $P6_3/mmc$ and the breakage of the crystal structure by the desorption and insertion of sodium ions is prevented. It should be noted that the crystal structure starts to shift from the $P6_3/mmc$ if the value of x is outside the above range. For example, the crystal takes an R-3m structure when x is around 1. A preferred range is $0.5 \leq x \leq 0.7$. While conventional sodium transition metal composite oxides with a $P6_3/mmc$ structure inevitably contain subphases having other crystal structures, the sodium transition metal composite oxide obtained by the producing methods of the invention is substantially composed of a $P6_3/mmc$ structure alone.

By limiting y to $0.25 \leq y < 1.0$, the obtainable $P6_3/mmc$ sodium transition metal composite oxide attains good crystallinity. It should be noted that any value of y outside this range causes a decrease in crystallinity and/or the occurrence of subphases. A preferred range is $0.25 \leq y \leq 0.75$.

The letter M is at least one element selected from the group consisting of manganese, cobalt and nickel having a similar ion radius to iron. The use of these elements M advantageously makes it easy to obtain the desired crystal structure. When M is manganese, the target material with a stable crystal structure may be obtained easily.

1-2. Oxo Acid Ions

The positive-electrode active material of the invention sometimes contains a trace amount of oxo acid ions. According to ICP-AES (inductively coupled plasma atomic emission spectrometry), the content of oxo acid ions is preferably not more than 0.3 wt %, more preferably not more than 0.1 wt %, further preferably not more than 0.05 wt %, and particularly preferably below the detection limit or around the detection limit (about 300 ppm). Examples of the oxo acid ions include sulfate ions and nitrate ions.

1-3. Crystal Structures

Preferably, the crystal structure of the positive-electrode active material of the invention shows a specific characteristic in powder X-ray diffractometry. When, for example, the peak intensity assigned to the (110) plane has a high ratio to the peak intensity assigned to the (016) plane, hereinafter, also written as "(110)/(016)", the crystal structure achieves higher strength and becomes more resistant to breakage by the desorption and insertion of sodium ions, resulting in improved cycle characteristics. The peak intensity ratio is preferably not less than 0.30. A peak intensity ratio higher than 2.00 indicates a possibility of the presence of crystal phases other than the $P6_3/mmc$ phase. Thus, the peak intensity ratio is preferably not more than 2.00, more preferably 0.35 to 1.00, and particularly preferably 0.40 to 0.80.

The (110) plane shows a diffraction peak in the range where $2\theta$ is 61.2° to 61.7°, and the (016) plane shows a diffraction peak in the range where $2\theta$ is 63.3° to 63.8°.

The integral widths of the (016) plane peak and the (110) plane peak serve as an indicator of how well the sodium transition metal composite oxide has been crystallized. Smaller widths are more preferable. The integral width is preferably not more than 1.00°, and more preferably not more than 0.50° for the (016) plane peak, and is preferably not more than 0.30°, and more preferably not more than 0.25° for the (110) plane peak. A realistic value of the integral width is 0.10° or above for both peaks.

In the positive-electrode active material, the content of the sodium transition metal composite oxide represented by the above formula is not particularly limited. For example, the content may be 80 mass % or more, and preferably 95 mass % or more. It is more preferable that the positive-electrode active material is substantially composed of the sodium transition metal composite oxide represented by the above formula alone. The term "substantially" means that the positive-electrode active material may include compounds other than the sodium transition metal composite oxide represented by the above formula as long as the advantageous effects of the invention are achieved.

The positive-electrode active materials for non-aqueous secondary battery of the invention may be preferably produced by any of the following production methods which advantageously allow for efficient production.

2. Methods for Producing Positive-Electrode Active Materials for Non-Aqueous Secondary Battery Next, there will be described the methods for producing positive-electrode active materials for non-aqueous secondary battery according to the invention. The inventive methods for producing positive-electrode active materials for non-aqueous electrolyte secondary battery may be performed largely in two embodiments.

2-1. First Embodiment

In the method for producing a positive-electrode active material for non-aqueous secondary battery of the invention, the first embodiment is a method for producing a positive-electrode active material for non-aqueous secondary battery including a sodium transition metal composite oxide represented by Formula $Na_xFe_{1-y}M_yO_2$, wherein $0.4 \le x \le 0.7$, $0.25 \le y < 1.0$, and M is at least one element selected from the group consisting of manganese, cobalt and nickel, and is characterized by including a precipitate formation step of obtaining a precipitate of a transition metal composite compound from a transition metal ion-containing aqueous solution, a heat treatment step of heat treating the precipitate from the precipitate formation step to obtain a transition metal composite oxide precursor, a mixing step of mixing the precursor from the heat treatment step with at least a sodium compound to obtain a raw material mixture, and a calcination step of calcining the raw material mixture from the mixing step to obtain a calcined product.

2-1-1. Chemical Composition

The sodium transition metal composite oxide that is the main component in the target positive-electrode active material is represented by the above formula. Details are as mentioned in the description of the positive-electrode active materials for non-aqueous secondary battery according to the invention.

2-1-2. Precipitate Formation Step

In the precipitate formation step, a precipitate of a transition metal composite compound is obtained from a transition metal ion-containing aqueous solution. The precipitate formation step is preferably a step in which a basic compound such as sodium hydroxide is added to the transition metal ion-containing aqueous solution to adjust the pH and to obtain a precipitate of a poorly soluble transition metal composite compound.

The transition metal ion-containing aqueous solution may be appropriately prepared by, for example, dissolving transition metal compounds such as chlorides, sulfate salts and nitrate salts into an acid or pure water, or by dissolving transition metals into an acid. Any appropriate acids such as hydrochloric acid, nitric acid and sulfuric acid may be selected in accordance with the solutes. In view of factors such as loads to the facility and the environment, availability and easiness in handling, the transition metal ion-containing aqueous solution that is obtained is preferably an aqueous sulfate salt solution. When an aqueous sulfate salt solution is used, the heat treatment step described later has a particular importance.

The transition metal ion-containing aqueous solution contains at least iron ions, and further contains ions of at least one transition metal selected from the group consisting of manganese, cobalt and nickel (hereinafter, also written as specific transition metal ions). The ratio of the content of iron ions to the content of specific transition metal ions may be selected appropriately in accordance with the chemical composition of the target transition metal composite compound.

Examples of the poorly soluble transition metal composite compounds include hydroxides, carbonate salts and oxalate salts. From the viewpoint of handling, hydroxides are preferable.

2-1-3. Heat Treatment Step

In the heat treatment step, the transition metal composite compound obtained in the precipitation step is heat treated to form a transition metal composite oxide precursor. This step removes the counter ions (for example, sulfate ions when the transition metal ion-containing aqueous solution is an aqueous sulfate salt solution) from the transition metal composite compound, resulting in a transition metal composite oxide precursor which contains less impurities and has been crystallized to a degree. The counter ions remaining in the precursor cause a decrease in the crystallinity of the final sodium transition metal composite oxide. When, in particular, the counter ions are sulfate ions, the importance of this step further increases because the sulfate ions will remain even in the final sodium transition metal composite oxide to possibly adversely affect moisture absorption properties and various battery characteristics.

The temperature of the heat treatment requires careful control because the treatment at an excessively low temperature results in insufficient crystallization and insufficient counter ion removal while too high temperatures cause sintering to proceed excessively and undesired phases to occur. To fulfill the purpose, the heat treatment temperature is preferably in the range of 600° C. to 1000° C., although the tendencies of heat treatment vary slightly depending on the chemical composition. The heating temperature is more preferably 800° C. to 950° C. because the unity or uniformity of the crystal structure is markedly increased.

The heat treatment is performed for at least a certain time period because too short a treatment time does not allow the reaction to complete. The heat treatment time may be extended to any extent without a problem. However, performing the heat treatment for an overly long time only protracts the step and is thus not necessary. In view of these, the heat treatment time is preferably 0.5 hours to 50 hours, and more preferably 3 hours to 24 hours.

The heat treatment step may be performed in any atmosphere without limitation, but is preferably carried out in an oxidizing atmosphere. Examples of the oxidizing atmospheres include air atmosphere and oxygen-containing atmospheres.

2-1-4. Mixing Step

In the mixing step, the precursor is mixed with at least a sodium compound to give a raw material mixture. The sodium compounds may be any compounds which can be decomposed into oxides at high temperatures, with examples including sodium carbonate, sodium hydroxide, sodium oxide, sodium peroxide, sodium chloride, sodium nitrate and sodium sulfate. In particular, sodium oxide and sodium peroxide are preferable due to their high reactivity in the calcination step, but this characteristic also requires careful attention in the mixing step such as the need of handling the compound in an inert atmosphere such as nitrogen or argon. Sodium carbonate is advantageously easy to handle in the mixing step. The sodium compounds such as sodium nitrate should be handled sufficiently carefully although the counter ions in these compounds are removed more easily in the subsequent calcination step compared to the counter ions contained in the precursor. From these viewpoints, sodium compounds other than strong acid salts are preferable such as sodium carbonate, sodium hydroxide, sodium oxide and sodium peroxide.

The mixing ratio of the precursor to the sodium compound in the raw material mixture may be selected appropriately in accordance with the chemical composition of the target sodium transition metal composite oxide. The raw material mixture may further contain additives such as sintering auxiliaries (fluxes) in accordance with the purpose.

The mixing step may involve using any of known mixers such as ball mills, twin-cylinder mixers and stirrers.

2-1-5. Calcination Step

In the calcination step, the raw material mixture from the mixing step is calcined to give a calcined product. Any of known calcination means may be selected appropriately in accordance with the purpose. For example, the raw material mixture may be compacted before the calcination or may be charged into a crucible directly.

Examples of the calcination furnaces which may be used include batch furnaces, tunnel furnaces and rotary kilns. The calcination temperature needs to be controlled carefully because too low calcination temperatures cause undesired subphases to occur and too high calcination temperatures cause sintering to proceed excessively. Calcination temperatures of 700° C. to 1100° C. advantageously ensure that a calcined product with a $P6_3/mmc$ phase may be obtained. The calcination temperature is more preferably 800° C. to 1000° C.

The calcination step may be performed in any atmosphere without limitation, but is preferably carried out in an oxidizing atmosphere. Examples of the oxidizing atmospheres include air atmosphere and oxygen-containing atmospheres.

2-1-6. Additional Steps

The calcined product obtained above may be subjected to treatments such as pulverization, washing and sieving as required, thereby obtaining a positive-electrode active material for non-aqueous secondary battery including the target sodium transition metal composite oxide.

2-2. Second Embodiment

In the method for producing a positive-electrode active material for non-aqueous secondary battery of the invention, the second embodiment is a method for producing a positive-electrode active material for non-aqueous secondary battery including a sodium transition metal composite oxide represented by Formula $Na_xFe_{1-y}M_yO_2$ (wherein $0.4 \leq x \leq 0.7$, $0.25 \leq y < 1.0$, and M is at least one element selected from the group consisting of manganese, cobalt and nickel), and is characterized by including a precipitate formation step of obtaining a precipitate based on (namely, containing as a main component) a transition metal composite compound other than a hydroxide from a transition metal ion-containing aqueous solution, a mixing step of mixing the precipitate from the precipitate formation step with at least a sodium compound to obtain a raw material mixture, and a calcination step of calcining the raw material mixture from the mixing step to obtain a calcined product.

2-2-1. Chemical Composition

The chemical composition is similar to that described in the first embodiment.

2-2-2. Precipitate Formation Step

In the precipitate formation step, a precipitate based on a transition metal composite compound other than a hydroxide is obtained from a transition metal ion-containing aqueous solution. The precipitate formation step is preferably a step in which a basic compound such as sodium hydroxide is added to the transition metal ion-containing aqueous solution to adjust the pH, and a specific precipitating agent is added to obtain a precipitate of a poorly soluble transition metal composite compound. This precipitate is based on a transition metal composite compound derived from the precipitating agent, and contains no or little hydroxide. Although variable depending on conditions such as the pH value adjusted and the precipitating agent used, the content of hydroxide ions in the precipitate is preferably about 3 mol % or less, and particularly preferably 1 mol % or less relative to 100 mol % of the anions derived from the precipitating agent.

The transition metal ion-containing aqueous solution may be appropriately prepared by, for example, dissolving transition metal compounds such as chlorides, sulfate salts and nitrate salts into an acid or pure water, or by dissolving transition metals into an acid. Any appropriate acids such as hydrochloric acid, nitric acid and sulfuric acid may be selected in accordance with the solutes. In view of factors such as loads to the facility and the environment, availability and easiness in handling, the transition metal ion-containing aqueous solution that is obtained is preferably an aqueous sulfate salt solution.

The transition metal ion-containing aqueous solution contains at least iron ions, and further contains at least one type of specific transition metal ions selected from the group consisting of manganese, cobalt and nickel. The ratio of the content of iron ions to the content of specific transition metal ions may be selected appropriately in accordance with the chemical composition of the target transition metal composite compound.

Examples of the poorly soluble transition metal composite compounds include carbonate salts and oxalate salts. Carbonate salts are preferable from the viewpoint of the relation with the precipitating agent as will be described below and also from the viewpoint of the performance of the positive-electrode active material.

A precipitate obtained by pH adjustment alone is based on a hydroxide, hereinafter, also written as hydroxide precipitate for convenience. A hydroxide precipitate formed sometimes contains the counter ions present in the transition metal ion-containing aqueous solution, for example, sulfate ions in the case of an aqueous sulfate salt solution. The remaining of the counter ions can cause a decrease in the crystallinity of the final sodium transition metal composite oxide. When, in particular, the counter ions are sulfate ions, the sulfate ions will remain even in the final sodium transition metal composite oxide to possibly adversely affect moisture absorption properties and various battery characteristics. To prevent such problems, a precipitating agent is used in combination with the pH adjustment to form a precipitate that is based on a transition metal composite compound other than a hydroxide. In this manner, the precipitate is prevented from containing an excessively large amount of undesired counter ions.

Examples of the precipitating agents include carbon dioxide, water-soluble carbonate salts, oxalic acid and water-soluble oxalate salts. From viewpoints such as easiness in handling and costs, carbon dioxide and water-soluble carbonate salts are preferable, and carbon dioxide is particularly preferable.

2-2-3. Heat Treatment Step

Prior to the mixing step described below, the transition metal composite compound from the precipitate formation step may be subjected to a heat treatment to form a transition metal composite oxide. Even in the case where a slight amount of a hydroxide precipitate has been formed in the precipitate formation step, this heat treatment removes sufficiently the counter ions from the precipitate of the transition metal composite compound. Although variable depending on the chemical composition, the heat treatment temperature may be appropriately 600° C. to 1000° C. At such temperatures, the counter ions may be removed to a sufficient extent without causing excessive sintering. For details in the heat treatment step, refer to the description of the heat treatment step in the first embodiment.

2-2-4. Mixing Step

In the mixing step, the precipitate, or the transition metal composite oxide from the heat treatment step, is mixed with at least a sodium compound to give a raw material mixture. The sodium compounds may be any compounds which can be decomposed into oxides at high temperatures, with examples including sodium carbonate, sodium hydroxide, sodium oxide, sodium peroxide, sodium chloride, sodium nitrate and sodium sulfate. In particular, sodium oxide and sodium peroxide are preferable due to their high reactivity in the calcination step, but this characteristic also requires careful attention in the mixing step such as the need of handling the compound in an inert atmosphere such as nitrogen or argon. Sodium carbonate is advantageously easy to handle in the mixing step. The sodium compounds such as sodium nitrate should be handled sufficiently carefully although the counter ions in these compounds are removed more easily in the subsequent calcination step compared to the counter ions contained in the precipitate. From these viewpoints, sodium compounds other than strong acid salts are preferable such as sodium carbonate, sodium hydroxide, sodium oxide and sodium peroxide.

The mixing ratio of the precipitate to the sodium compound in the raw material mixture may be selected appropriately in accordance with the chemical composition of the target sodium transition metal composite oxide. The raw material mixture may further contain additives such as sintering auxiliaries (fluxes) in accordance with the purpose.

The mixing step may involve using any of known mixers such as ball mills, twin-cylinder mixers and stirrers.

2-2-5. Calcination Step

The calcination step is performed in accordance with the first embodiment.

2-2-6. Additional Steps

Additional steps may be performed in accordance with the first embodiment.

3. Non-Aqueous Secondary Batteries

Next, an example will be described in which non-aqueous secondary batteries are manufactured with the positive-electrode active materials for non-aqueous secondary battery of the invention.

3-1. Positive-Electrodes

The positive-electrode active material for non-aqueous secondary battery may be mixed with known components such as a conductive material and a binder to give a positive-electrode mixture, which is then applied to a known positive-electrode collector to form a positive-electrode active material layer. Thus, a positive-electrode for non-aqueous secondary battery may be obtained.

Examples of the conductive materials include natural graphite, artificial graphite and acetylene black. Examples of the binders include polyvinylidene fluoride, polytetrafluoroethylene and polyamide acrylic resin.

Examples of the materials of positive-electrode collectors include aluminum, nickel and stainless steel.

For example, the positive-electrode active material layer may be formed by dispersing the positive-electrode mixture in a solvent, applying the dispersion to the positive-electrode collector, and drying and pressing the wet coating, or may be formed by directly providing the positive-electrode mixture on the positive-electrode collector by pressure forming.

3-2. Non-Aqueous Secondary Batteries

A non-aqueous secondary battery may be obtained using the positive-electrode for non-aqueous secondary battery obtained above and other known components such as a negative electrode for non-aqueous secondary battery, a non-aqueous electrolytic solution or a solid electrolyte, and a separator.

The negative electrode for non-aqueous secondary battery may be obtained by applying a known negative electrode active material for non-aqueous secondary battery on a known negative electrode collector to form a negative electrode active material layer.

Examples of the negative electrode active materials include metallic sodium, sodium alloys and materials capable of doping and dedoping of sodium ions. Exemplary materials capable of doping and dedoping of sodium ions include carbonaceous materials, chalcogen compounds such as oxides and sulfides capable of sodium ion doping and dedoping at lower potential than the positive-electrode, and borate salts. Where necessary, the negative electrode active material may form a negative electrode mixture with a thermoplastic resin as a binder. Examples of the thermoplastic resins include polyvinylidene fluoride, polyethylene and polypropylene.

Examples of materials for the negative electrode collectors include aluminum, copper, nickel and stainless steel. Aluminum is preferable due to easiness in thin film production and inexpensiveness. In contrast to lithium ion batteries, sodium ion batteries allow use of aluminum as negative electrode collectors. Thus, sodium ion batteries surpass lithium ion batteries in terms of cost and easy handling. For example, the negative electrode active material layer may be formed by directly providing the negative electrode active material or the negative electrode mixture on the negative electrode collector by pressure forming, or may be formed by dispersing the negative electrode active material optionally together with other components in a solvent, applying the dispersion on the negative electrode collector, and drying and pressing the wet coating.

When the transportation of sodium ions is mediated by a non-aqueous electrolytic solution, the solvent of the electrolytic solution may be an organic solvent. Examples thereof include dimethoxyethane, diethoxyethane, ethylene carbonate, propylene carbonate, dimethyl carbonate, diethyl carbonate, methyl ethyl carbonate, methyl formate, γ-butyrolactone, 2-methyltetrahydrofuran, dimethylsulfoxide and sulfolane.

Examples of the electrolytes include sodium salts such as sodium perchlorate, sodium tetrafluoroborate, sodium hexafluorophosphate and sodium trifluoromethanesulfonate. The electrolytic solution may be gelled by the addition of an agent such as a gelling agent. Further, the electrolytic solution may be absorbed into an absorbent polymer. The sodium ion concentration in the electrolytic solution may be adjusted appropriately in accordance with the purpose.

When sodium ions are transported via a solid electrolyte, for example, a polymer compound having a polyethylene oxide backbone, or a polymer compound containing at least one of polyorganosiloxane chains and polyoxyalkylene chains may be used. Further, solid electrolytes including inorganic compounds may be used.

Examples of the separators include porous films such as of polyethylene and polypropylene.

The shapes of the non-aqueous secondary batteries are not particularly limited and may be determined in accordance with any known configurations and appropriate modifications of such known shapes.

EXAMPLES

Hereinbelow, the present invention will be described in further detail based on Examples without limiting the scope of the invention.

First, the first embodiment will be described based on some examples.

Example 1

Precipitate Formation Step

Iron (II) sulfate and manganese sulfate were dissolved in pure water such that the ratio of the amounts thereof by mole would be Fe:Mn=1:1. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped to the reaction field, thereby obtaining a precipitate of a transition metal composite hydroxide represented by the composition formula $(Fe_{0.5}Mn_{0.5})(OH)_2$.

Heat Treatment Step

The precipitate was separated from the reaction field and was heat treated in air at 900° C. for 12 hours to give a transition metal composite oxide precursor represented by the composition formula $(Fe_{0.5}Mn_{0.5})_2O_3$, hereinafter, also written as "transition metal precursor".

Mixing Step

After the heat treatment, 0.35 mol of sodium carbonate and 1.0 mol of the transition metal precursor were mixed with each other to give a raw material mixture.

Calcination Step

The raw material mixture was calcined in air at 900° C. to give a positive-electrode active material represented by the composition formula $Na_{0.7}(Fe_{0.5}Mn_{0.5})O_2$.

Example 2

A positive-electrode active material represented by the composition formula $Na_{0.7}(Fe_{0.5}Mn_{0.5})O_2$ was obtained in the same manner as in Example 1, except that the heat treatment temperature in the heat treatment step was changed to 650° C.

Comparative Example 1

A positive-electrode active material represented by the composition formula $Na_{0.7}(Fe_{0.5}Mn_{0.5})O_2$ was obtained in the same manner as in Example 1, except that the heat treatment step in Example 1 was omitted.

Comparative Example 2

A positive-electrode active material represented by the composition formula $Na_{0.3}(Fe_{0.5}Mn_{0.5})O_2$ was obtained in the same manner as in Example 1, except that the mixing step involved 0.15 mol of sodium carbonate.

Comparative Example 3

A positive-electrode active material represented by the composition formula $Na(Fe_{0.5}Mn_{0.5})O_2$ was obtained in the same manner as in Example 1, except that the mixing step involved 0.50 mol of sodium carbonate.

Example 3

Precipitate Formation Step

Iron (II) sulfate and manganese sulfate were dissolved in pure water such that the ratio of the amounts thereof by mole would be Fe:Mn=2:8. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped to the reaction field, thereby obtaining a precipitate of a transition metal composite hydroxide represented by the composition formula $(Fe_{0.2}Mn_{0.8})(OH)_2$.

Heat Treatment Step and Subsequent Steps

The precipitate was treated in the same manner as in Example 1 to give a positive-electrode active material represented by the composition formula $Na_{0.2}(Fe_{0.2}Mn_{0.8})O_2$.

Comparative Example 4

Precipitate Formation Step

Iron (II) sulfate and manganese sulfate were dissolved in pure water such that the ratio of the amounts thereof (by mole) would be Fe:Mn=8:2. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped to the reaction field, thereby obtaining a precipitate of a transition metal composite hydroxide represented by the composition formula $(Fe_{0.8}Mn_{0.2})(OH)_2$.

[Heat Treatment Step and Subsequent Steps]

The precipitate was treated in the same manner as in Example 1 to give a positive-electrode active material represented by the composition formula $Na_{0.7}(Fe_{0.8}Mn_{0.2})O_2$.

Comparative Example 5

Precipitate Formation Step

Manganese sulfate was dissolved in pure water to form a reaction field consisting of an aqueous manganese sulfate solution. The liquid temperature of the reaction field was adjusted to 50° C. While performing stirring, a prescribed amount of an aqueous sodium hydroxide solution was dropped to the reaction field, thereby obtaining a precipitate of manganese hydroxide represented by the composition formula $Mn(OH)_2$.

Heat Treatment Step and Subsequent Steps

The precipitate was treated in the same manner as in Example 1 to give a positive-electrode active material represented by the composition formula $Na_{0.7}MnO_2$.

Example 4

Precipitate Formation Step

Iron (II) sulfate and cobalt sulfate were dissolved in pure water such that the ratio of the amounts thereof by mole would be Fe:Co=1:1. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped to the reaction field, thereby obtaining a precipitate of a transition metal composite hydroxide represented by the composition formula $(Fe_{0.5}Co_{0.5})(OH)_2$.

Heat Treatment Step and Subsequent Steps

The precipitate was treated in the same manner as in Example 1 to give a positive-electrode active material represented by the composition formula $Na_{0.7}(Fe_{0.5}Co_{0.5})O_2$.

Example 5

Precipitate Formation Step

Iron (II) sulfate and nickel sulfate were dissolved in pure water such that the ratio of the amounts thereof (by mole) would be Fe:Ni=1:1. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped to the reaction field, thereby obtaining a precipitate of a transition metal composite hydroxide represented by the composition formula $(Fe_{0.5}Ni_{0.5})(OH)_2$.

Heat Treatment Step and Subsequent Steps

The precipitate was treated in the same manner as in Example 1 to give a positive-electrode active material represented by the composition formula $Na_{0.7}(Fe_{0.5}Ni_{0.5})O_2$.

Next, the second embodiment will be described based on some examples.

Example 6

Precipitate Formation Step

Iron (II) sulfate and manganese sulfate were dissolved in pure water such that the ratio of the amounts thereof by mole would be Fe:Mn=1:1. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped and simultaneously a prescribed amount of $CO_2$ gas was blown to the reaction field, thereby obtaining a precipitate of a transition metal composite carbonate salt represented by the composition formula $(Fe_{0.5}Mn_{0.5})CO_3$. The precipitate was separated from the reaction field and was dried into a powder.

Mixing Step

A raw material mixture was obtained by mixing 0.35 mol of sodium carbonate and 1.0 mol of the precipitate of the transition metal composite carbonate salt.

Calcination Step

The raw material mixture was calcined in air at 900° C. to give a positive-electrode active material represented by the composition formula $Na_{0.7}(Fe_{0.5}Mn_{0.5})O_2$.

Comparative Example 6

A positive-electrode active material represented by the composition formula $Na_{0.3}(Fe_{0.5}Mn_{0.5})O_2$ was obtained in the same manner as in Example 6, except that the mixing step involved 0.15 mol of sodium carbonate.

Comparative Example 7

A positive-electrode active material represented by the composition formula $Na(Fe_{0.5}Mn_{0.5})O_2$ was obtained in the same manner as in Example 6, except that the mixing step involved 0.50 mol of sodium carbonate.

Example 7

Precipitate Formation Step

Iron (II) sulfate and manganese sulfate were dissolved in pure water such that the ratio of the amounts thereof by mole would be Fe:Mn=2:8. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped and simultaneously a prescribed amount of $CO_2$ gas was blown to the reaction field, thereby obtaining a precipitate of a transition metal composite carbonate salt represented by the composition formula $(Fe_{0.2}Mn_{0.8})CO_3$. The precipitate was separated from the reaction field and was dried into a powder.

Mixing Step and Subsequent Step

The precipitate was treated in the same manner as in Example 6 to give a positive-electrode active material represented by the composition formula $Na_{0.7}(Fe_{0.2}Mn_{0.8})O_2$.

Comparative Example 8

Precipitate Formation Step

Iron (II) sulfate and manganese sulfate were dissolved in pure water such that the ratio of the amounts thereof by mole would be Fe:Mn=8:2. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped and simultaneously a prescribed amount of $CO_2$ gas was blown to the reaction field, thereby obtaining a precipitate of a transition metal composite carbonate salt represented by the composition formula $(Fe_{0.8}Mn_{0.2})CO_3$. The precipitate was separated from the reaction field and was dried into a powder.

Mixing Step and Subsequent Step

The precipitate was treated in the same manner as in Example 6 to give a positive-electrode active material represented by the composition formula $Na_{0.7}(Fe_{0.8}Mn_{0.2})O_2$.

Comparative Example 9

Precipitate Formation Step

Manganese sulfate was dissolved in pure water to form a reaction field consisting of an aqueous manganese sulfate solution. The liquid temperature of the reaction field was adjusted to 50° C. While performing stirring, a prescribed amount of an aqueous sodium hydroxide solution was dropped and simultaneously a prescribed amount of $CO_2$ gas was blown to the reaction field, thereby obtaining a precipitate of manganese carbonate represented by the composition formula $MnCO_3$. The precipitate was separated from the reaction field and was dried into a powder.

Mixing Step and Subsequent Step

The precipitate was treated in the same manner as in Example 6 to give a positive-electrode active material represented by the composition formula $Na_{0.7}MnO_2$.

Example 8

Precipitate Formation Step

Iron (II) sulfate and cobalt sulfate were dissolved in pure water such that the ratio of the amounts thereof by mole would be Fe:Co=1:1. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped and simultaneously a prescribed amount of $CO_2$ gas was blown to the reaction field, thereby obtaining a precipitate of a transition metal composite carbonate salt represented by the composition formula $(Fe_{0.5}Co_{0.5})CO_3$. The precipitate was separated from the reaction field and was dried into a powder.

[Mixing Step and Subsequent Step]

The precipitate was treated in the same manner as in Example 6 to give a positive-electrode active material represented by the composition formula $Na_{0.7}(Fe_{0.5}Co_{0.5})O_2$.

Example 9

Precipitate Formation Step

Iron (II) sulfate and nickel sulfate were dissolved in pure water such that the ratio of the amounts thereof by mole would be Fe:Ni=1:1. Thus, a reaction field consisting of an aqueous transition metal sulfate salt solution was prepared. The liquid temperature of the reaction field was adjusted to 50° C. While performing stirring, a prescribed amount of an aqueous sodium hydroxide solution was dropped and simultaneously a prescribed amount of $CO_2$ gas was blown to the reaction field, thereby obtaining a precipitate of a transition metal composite carbonate salt represented by the composition formula $(Fe_{0.5}Ni_{0.5})CO_3$. The precipitate was separated from the reaction field and was dried into a powder.

Mixing Step and Subsequent Step

The precipitate was treated in the same manner as in Example 6 to give a positive-electrode active material represented by the composition formula $Na_{0.7}(Fe_{0.5}Ni_{0.5})O_2$.

Example 10

Precipitate Formation Step

A precipitate of a transition metal composite carbonate salt represented by the composition formula $(Fe_{0.5}Mn_{0.5})CO_3$ was obtained in the same manner as in Example 6. The precipitate was separated from the reaction field and was dried into a powder.

Heat Treatment Step

The transition metal composite carbonate salt was heat treated in air at 900° C. for 12 hours to give a transition metal composite oxide represented by the composition formula $(Fe_{0.5}Mn_{0.5})_2O_3$.

Mixing Step

After the heat treatment, 0.35 mol of sodium carbonate and 1.0 mol of the transition metal composite oxide were mixed with each other to give a raw material mixture.

Calcination Step

The raw material mixture was calcined in air at 900° C. to give a positive-electrode active material represented by the composition formula $Na_{0.7}(Fe_{0.5}Mn_{0.5})O_2$.

Example 11

Precipitate Formation Step

Iron (II) sulfate and manganese sulfate were dissolved in pure water such that the ratio of the amounts thereof (by mole) would be Fe:Mn=1:1. Thus, a reaction field consisting of an aqueous transition metal sulfate salt solution was prepared. The liquid temperature of the reaction field was adjusted to 50° C. While performing stirring, prescribed amounts of an aqueous sodium hydroxide solution and an aqueous oxalic acid solution were dropped to the reaction field, thereby obtaining a precipitate of a transition metal composite oxalate salt represented by the composition formula $(Fe_{0.5}Mn_{0.5})(COO)_2$. The precipitate was separated from the reaction field and was dried into a powder.

Mixing Step

After a drying treatment, 0.35 mol of sodium carbonate and 1.0 mol of the precipitate of the transition metal composite oxalate salt were mixed with each other to give a raw material mixture.

Calcination Step

The raw material mixture was calcined in air at 900° C. to give a positive-electrode active material represented by the composition formula $Na_{0.7}(Fe_{0.5}Mn_{0.5})O_2$.

Finally, for comparison, a conventional process will be described below.

Comparative Example 10

Powders of iron (II) oxide, manganese (III) oxide and sodium carbonate were mixed together such that the ratio of the amounts thereof (by mole) would be Na:Fe:Mn=0.7:0.5:0.5. The resultant raw material mixture was calcined in air at 900° C. for 12 hours to give a positive-electrode active material represented by the composition formula $Na_{0.7}(Fe_{0.5}Mn_{0.5})O_2$.

Evaluations of Positive-Electrode Active Materials

The positive-electrode active materials of Examples 1 to 11 and Comparative Examples 1 to 10 were subjected to the following evaluations.

1. XRD Measurement

With a powder X-ray diffractometer, XRD spectra of the positive-electrode active materials were obtained. As the X-ray, CuK α1 radiation ($\lambda$=1.540562 Å) was used. The measurement was performed under conditions of a tube current of 40 mA and a tube voltage of 40 kV.

2. Evaluation of Moisture Proofness

The positive-electrode active material weighing 20 g was placed onto a tray and was allowed to stand in a thermostatic chamber in which the dew point was 20° C. After 24 hours and 72 hours, the positive-electrode active material was heated at 200° C. The weight change between before and after the heating was calculated to obtain the moisture absorption rate of the positive-electrode active material.

Evaluation of Battery Characteristics

Sample batteries were manufactured using the positive-electrode active materials of Examples 1 to 11 and Comparative Examples 1 to 10, and battery characteristics were evaluated.

1. Fabrication of Sample Batteries

1-1. Preparation of Positive-Electrodes

In NMP (N-methyl-2-pyrrolidone), 90 parts by weight of the positive-electrode composition, 5.0 parts by weight of acetylene black and 5.0 parts by weight of PVDF (polyvinylidene fluoride) were dispersed to give a positive-electrode slurry. The positive-electrode slurry was applied to an aluminum foil as a collector, dried, and compression formed with a roll press machine. The positive-electrodes were cut to a prescribed size.

1-2. Preparation of Negative Electrodes

In NMP (N-methyl-2-pyrrolidone), 95 parts by weight of hard carbon and 5.0 parts by weight of PVDF (polyvinylidene fluoride) were dispersed to give a negative electrode slurry. The negative electrode slurry was applied to an aluminum foil as a collector, dried, and compression formed with a roll press machine. The negative electrodes were cut to a prescribed size.

1-3. Preparation of Non-Aqueous Electrolytic Solution

EC (ethylene carbonate) and DEC (diethyl carbonate) were mixed with each other in a volume ratio of 1:1 to give a mixed solvent. Sodium hexafluorophosphate ($NaPF_6$) was dissolved in the mixed solvent with a concentration of 1 mol/l. Thus, a non-aqueous electrolytic solution was obtained.

1-4. Assembling of Sample Batteries

Lead electrodes were attached to the respective collectors of the positive-electrode and the negative electrode, and the electrodes were dried in vacuum at 120° C. Next, a porous polyethylene separator was provided between the positive-electrode and the negative electrode, and the unit was placed into a laminate pack in the form of a bag. The package was dried in vacuum at 60° C. to remove water that had been adsorbed onto the components. After the vacuum drying, the non-aqueous electrolytic solution was poured into the laminate pack, and the pack was sealed. In this manner, laminate-type samples of non-aqueous electrolyte secondary batteries were obtained.

2. Charge and Discharge Characteristics

A weak current was applied to the sample battery to perform aging, and thereby the positive-electrode and the negative electrode were allowed to sufficiently conform to the electrolyte. After the aging, the battery was charged by constant current-constant voltage charging with a full charge voltage of 4.4 V and a charging rate of 0.2 C (1 C: a current density at which a fully charged battery is fully discharged in 1 hour) (charging finish conditions: 0.008 C). The capacity obtained was the charge capacity. After the full charging, the battery was discharged at a constant current with a discharging voltage of 1.7 V and a discharging rate of 0.2 C. The capacity obtained was the discharge capacity. The ratio of the discharge capacity to the charge capacity was calculated to determine the charging-discharging efficiency.

3. Cycle Characteristics

The constant current-constant voltage charging and the constant current discharging described in the charge and discharge characteristics were repeated fifty times, and changes in discharge capacity were studied. The ratio of the discharge capacity in the n-th discharging to the discharge capacity in the first discharging was obtained as the capacity retention Ps (n) after n cycles.

Figure 2:
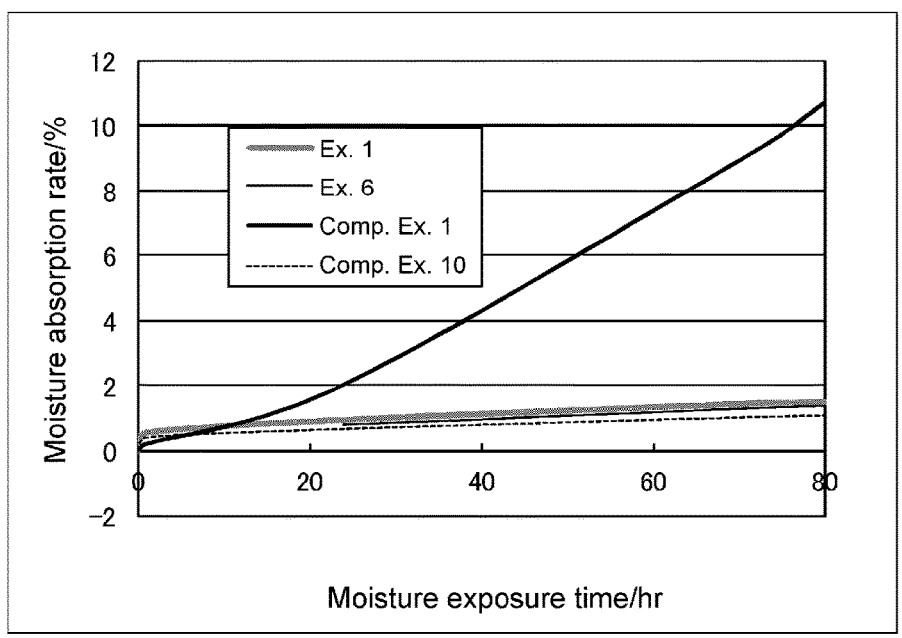
FIG. 2 illustrates an example of moisture absorption data of positive-electrode active materials of the embodiment and comparative positive-electrode active materials.
Figure 3:
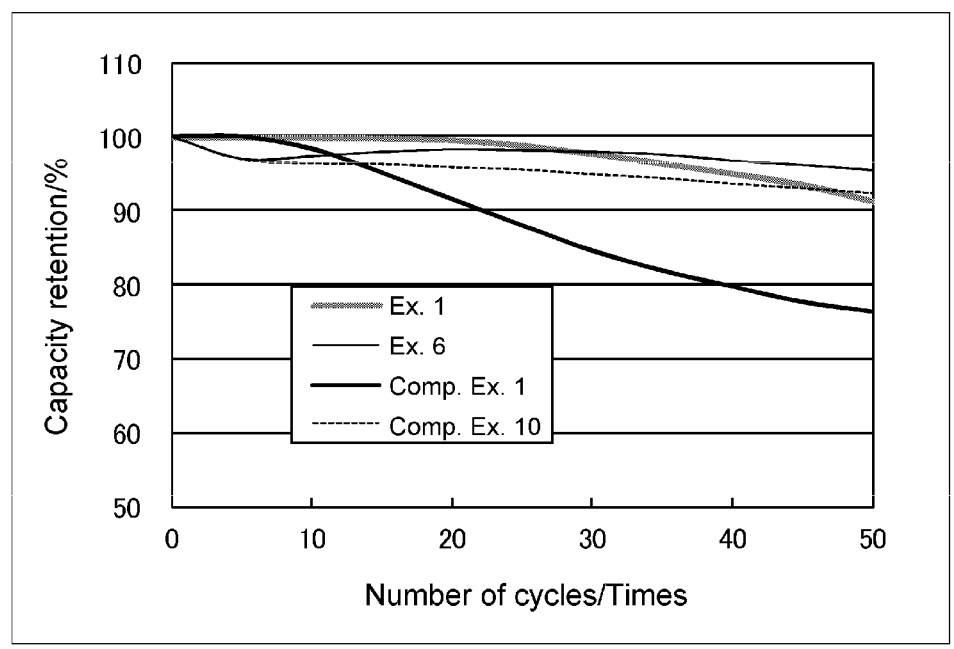
FIG. 3 illustrates an example of cycle characteristics of non-aqueous secondary batteries involving positive-electrode active materials of the embodiment and comparative positive-electrode active materials in the positive-electrodes.

For Examples 1 to 11 and Comparative Examples 1 to 10, the production conditions, the properties of the positive-electrode active materials, and the battery characteristics for Examples in which M was manganese are described in Tables 1, 2 and 3, respectively, and the production conditions, the properties of the positive-electrode active materials, and the battery characteristics for Examples in which M was cobalt or nickel are described in Tables 4, 5 and 6, respectively. For Examples 1 and 6 and Comparative Examples 1 and 10, the XRD spectra of the positive-electrode active materials are shown in FIG. 1, the moisture absorption properties of the positive-electrode active materials are shown in FIG. 2, and the cycle characteristics of the secondary batteries are shown in FIG. 3. In FIG. 1, peaks assigned to the (016) plane are seen in the region where 2θ is about 61.5°, and peaks assigned to the (110) plane are found in the region where 2θ is about 63.7°. The XRD spectra in Examples 2 to 5 and 7 to 11 and in Comparative Examples 5 and 9 were similar to those of Examples 1 and 6.

TABLE 1

| | x | y | M | Transition metal ions aq. | Precipitate | Heat treatment temperature/ °C. |
|---|---|---|---|---|---|---|
| Ex. 1 | 0.7 | 0.5 | Mn | Sulfate salt aq. | Hydroxide | 900 |
| Ex. 2 | | | | | | 650 |
| Comp. Ex. 1 | | | | | | — |
| Comp. Ex. 2 | 0.3 | | | | | 900 |
| Comp. Ex. 3 | 1 | | | | | |
| Ex. 3 | 0.7 | 0.8 | | | | |
| Comp. Ex. 4 | | 0.2 | | | | |
| Comp. Ex. 5 | | 1 | | | | |
| Ex. 6 | 0.7 | 0.5 | Mn | Sulfate salt aq. | Carbonate salt | — |
| Comp. Ex. 6 | 0.3 | | | | | |
| Comp. Ex. 7 | 1 | | | | | |
| Ex. 7 | 0.7 | 0.8 | | | | |
| Comp. Ex. 8 | | 0.2 | | | | |
| Comp. Ex. 9 | | 1 | | | | |
| Ex. 10 | | 0.5 | Mn | | | 900 |
| Ex. 11 | | 0.5 | | | Oxalate salt | — |
| Comp. Ex. 10 | 0.7 | 0.5 | Mn | — | — | — |

TABLE 2

| | Crystal phase | (016) integral width/° | (110) Integral width/° | (110)/(016) intensity ratio | $SO_4^{2-}$/wt % | Moisture absorption rate*/% |
|---|---|---|---|---|---|---|
| Ex. 1 | $P6_3$/mmc | 0.31 | 0.17 | 0.55 | <0.03 | 1.5 |
| Ex. 2 | | 0.43 | 0.23 | 0.53 | 0.10 | 3.2 |
| Comp. Ex. 1 | | 1.36 | 0.30 | 0.22 | 0.72 | 8.0 |
| Comp. Ex. 2 | Unidentifiable | 0.45 | 0.22 | 0.49 | <0.03 | 1.3 |
| Comp. Ex. 3 | R-3m | 0.36 | 0.22 | 0.61 | <0.03 | 1.5 |
| Ex. 3 | $P6_3$/mmc | 0.45 | 0.21 | 0.47 | <0.03 | 4.5 |
| Comp. Ex. 4 | R-3m•Pna21 | 0.23 | 0.19 | 0.83 | <0.03 | 1.8 |
| Comp. Ex. 5 | $P6_3$/mmc | 0.52 | 0.22 | 0.42 | <0.03 | 15.0 |
| Ex. 6 | $P6_3$/mmc | 0.43 | 0.16 | 0.37 | <0.03 | 1.3 |
| Comp. Ex. 6 | Unidentifiable | 0.48 | 0.22 | 0.46 | <0.03 | 1.4 |
| Comp. Ex. 7 | R-3m | 0.42 | 0.20 | 0.48 | <0.03 | 1.5 |
| Ex. 7 | $P6_3$/mmc | 0.45 | 0.20 | 0.44 | <0.03 | 4.5 |
| Comp. Ex. 8 | R-3m•Pna21 | 0.22 | 0.19 | 0.86 | <0.03 | 2.0 |
| Comp. Ex. 9 | $P6_3$/mmc | 0.52 | 0.21 | 0.40 | <0.03 | 10.0 |
| Ex. 10 | | 0.32 | 0.18 | 0.56 | <0.03 | 1.5 |
| Ex. 11 | | 0.32 | 0.19 | 0.59 | n.a. | 1.8 |
| Comp. Ex. 10 | $P6_3$/mmc•R-3m | 0.29 | 0.45 | 1.55 | <0.03 | 1.0 |

*After 72 hr
n.a.: not available

TABLE 3

| | Charge capacity/ mAhg$^{-1}$ | Discharge capacity/ mAhg$^{-1}$ | Charging-discharging efficiency/% | Ps(50)/% |
|---|---|---|---|---|
| Ex. 1 | 122 | 97 | 79 | 92 |
| Ex. 2 | 123 | 98 | 79 | 88 |
| Comp. Ex. 1 | 124 | 98 | 79 | 76 |
| Comp. Ex. 2 | 55 | 42 | 76 | 85 |
| Comp. Ex. 3 | 133 | 105 | 79 | 75 |
| Ex. 3 | 125 | 96 | 77 | 90 |
| Comp. Ex. 4 | 106 | 78 | 73 | 72 |
| Comp. Ex. 5 | 123 | 94 | 76 | 85 |
| Ex. 6 | 124 | 97 | 78 | 96 |
| Comp. Ex. 6 | 54 | 43 | 80 | 85 |
| Comp. Ex. 7 | 134 | 106 | 79 | 73 |
| Ex. 7 | 125 | 95 | 76 | 88 |
| Comp. Ex. 8 | 105 | 78 | 74 | 71 |
| Comp. Ex. 9 | 124 | 94 | 76 | 84 |
| Ex. 10 | 124 | 97 | 78 | 93 |
| Ex. 11 | 124 | 98 | 79 | 92 |
| Comp. Ex. 10 | 123 | 92 | 75 | 92 |

From Tables 1 and 2 and FIG. 1, the following is reached.

The peaks obtained in Examples 1 and 6 have a higher intensity and a narrower integral width than the peaks of Comparative Example 1, indicating that the $P6_3$/mmc structure achieved as high crystallinity as that obtained in Comparative Example 10. This result is probably ascribed to the removal of counter ions (sulfate ions in this case) by the heat treatment. On the other hand, the spectrum of Comparative Example 10 shows peaks indicating the presence of undesired R-3m phase (the three peaks enclosed with a broken line in FIG. 1). This result is probably because the elements were not uniformly mixed together in the mixing of the raw materials.

From Tables 1 and 2 and FIG. 2, the following is reached.

Omitting the heat treatment step in the first embodiment allows a large amount of sulfate ions to remain and hence results in high moisture absorption rate as illustrated in Comparative Example 1. The amount of residual sulfate ions is sufficiently decreased and the moisture absorption rate is lowered by performing the heat treatment as demonstrated in Example 1 or by obtaining the positive-electrode active material in accordance with the second embodiment as illustrated in Example 6.

From Tables 1 to 3 and FIG. 3, the following is obtained.

The non-aqueous electrolyte secondary batteries using the positive-electrode active materials of Examples 1 and 6 outperformed the battery based on Comparative Example 1 in terms of cycle characteristics. This result is probably attributed to the difference in crystallinity between Examples 1 and 6 and Comparative Example 1. On the other hand, the non-aqueous electrolyte secondary batteries using the positive-electrode active materials of Examples 1 and 6 achieved higher charging-discharging efficiency than the battery based on Comparative Example 10. This result is probably ascribed to the presence or absence of subphases other than the $P6_3$/mmc structure.

From Tables 1 to 3, the following is reached.

Values of x falling far outside the range of $0.4 \leq x \leq 0.7$ cause a failure for the positive-electrode active material to have a $P6_3$/mmc single phase structure and result in a decrease in charge-discharge capacity or a deterioration in cycle characteristics as demonstrated in Comparative Examples 2, 3, 6 and 7. Crystallinity is lowered or subphases are caused to occur if the value of y is outside the range of $0.25 \leq y < 1.0$ as illustrated in Comparative Examples 4, 5, 8 and 9.

TABLE 4

| | x | y | M | Transition metal ions aq. | Precipitate | Heat treatment temperature/ °C. |
|---|---|---|---|---|---|---|
| Ex. 4 | 0.7 | 0.5 | Co | Sulfate salt aq. | Hydroxide | 900 |
| Ex. 5 | 0.7 | 0.5 | Ni | Sulfate salt aq. | Hydroxide | 900 |
| Ex. 8 | 0.7 | 0.5 | Co | Sulfate salt aq. | Carbonate salt | — |
| Ex. 9 | 0.7 | 0.5 | Ni | Sulfate salt aq. | Carbonate salt | — |

TABLE 5

| | Crystal phase | (016) integral width/° | (110) Integral width/° | (110)/(016) intensity ratio | $SO_4^{2-}$/ wt % | Moisture absorption rate*/% |
|---|---|---|---|---|---|---|
| Ex. 4 | P6₃/mmc | 0.35 | 0.22 | 0.63 | n.a. | 1.3 |
| Ex. 5 | P6₃/mmc | 0.40 | 0.25 | 0.63 | n.a. | 1.2 |
| Ex. 8 | P6₃/mmc | 0.33 | 0.24 | 0.73 | n.a. | 1.5 |
| Ex. 9 | P6₃/mmc | 0.35 | 0.21 | 0.60 | n.a. | 1.1 |

*After 72 hr
n.a.: not available

TABLE 6

| | Charge capacity/ mAhg⁻¹ | Discharge capacity/ mAhg⁻¹ | Charging-discharging efficiency/% | Ps(50)/% |
|---|---|---|---|---|
| Ex. 4 | 132 | 98 | 74 | 92 |
| Ex. 5 | 140 | 101 | 72 | 92 |
| Ex. 8 | 133 | 99 | 74 | 89 |
| Ex. 9 | 138 | 103 | 75 | 93 |

From Tables 4 to 6, the following is obtained.

Even when M in the formula was replaced manganese with cobalt or nickel, the obtained peaks had a high intensity and a narrow integral width, showing high crystallinity of the P6₃/mmc structure. Further, the non-aqueous electrolyte secondary batteries obtained in such cases exhibited high charging-discharging efficiency and good cycle characteristics.

As demonstrated above, the positive-electrode active materials of the invention have good charge and discharge characteristics and good cycle characteristics, and are substantially free from residual counter ions. Thus, the inventive positive-electrode active materials may be suitably used in non-aqueous sodium secondary batteries. Further, the inventive methods for the producing of positive-electrode active materials can produce positive-electrode active materials which are satisfactory both in charge and discharge characteristics and cycle characteristics and in other properties.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for producing a positive-electrode active material for non-aqueous secondary battery comprising a sodium transition metal composite oxide represented by Formula:

$$Na_xFe_{1-y}M_yO_2,$$

wherein 0.4≤x≤0.7, 0.25≤y<1.0, and M is at least one element selected from the group consisting of manganese, cobalt and nickel, the method comprising:
a precipitate formation step of obtaining a precipitate of a transition metal composite compound from a transition metal ion-containing aqueous solution,
a heat treatment step of heat treating the precipitate from the precipitate formation step to obtain a transition metal composite oxide precursor,
a mixing step of mixing the precursor from the heat treatment step with at least a sodium compound to obtain a raw material mixture, and
a calcination step of calcining the raw material mixture from the mixing step to obtain a calcined product,
wherein the heat treatment temperature in the heat treatment step is 600° C. to 1000° C., and
wherein the calcined product contains the sodium transition metal composite oxide.

2. A method for producing a positive-electrode active material for non-aqueous secondary battery comprising a sodium transition metal composite oxide represented by Formula:

$$Na_xFe_{1-y}M_yO_2,$$

wherein 0.4x≤0.7, 0.25≤y<1.0, and M is at least one element selected from the group consisting of manganese, cobalt and nickel, the method comprising:
a precipitate formation step of obtaining a precipitate from a transition metal ion-containing aqueous solution, the precipitate containing a transition metal composite compound other than a hydroxide as a main component,
a mixing step of mixing the precipitate from the precipitate formation step with at least a sodium compound to obtain a raw material mixture, and
a calcination step of calcining the raw material mixture from the mixing step to obtain a calcined product,
wherein the method further comprises a heat treatment step of heat treating the precipitate from the precipitate formation step to obtain a transition metal composite oxide,
wherein the mixing step is a step of mixing the transition metal composite oxide with at least a sodium compound to obtain a raw material mixture,
wherein the heat treatment temperature in the heat treatment step is 600° C. to 1000° C., and
wherein the calcined product contains the sodium transition metal composite oxide.

3. The method according to claim 2, wherein the main component of the precipitate is a transition metal composite carbonate salt.

4. The method according to claim 1, wherein the transition metal ion-containing aqueous solution in the precipitate formation step is an aqueous transition metal sulfate salt solution.

5. The method according to claim 2, wherein the transition metal ion-containing aqueous solution in the precipitate formation step is an aqueous transition metal sulfate salt solution.

* * * * *